United States Patent [19]

Gustafsson et al.

[11] Patent Number: 5,229,888
[45] Date of Patent: Jul. 20, 1993

[54] REFLECTION AID

[76] Inventors: Anders Gustafsson, Nyhagen 36, S-427 00 Billdal; Anders Björck, Tulegatan 23, S-432 34 Varberg, both of Sweden

[21] Appl. No.: 775,999

[22] PCT Filed: May 16, 1990

[86] PCT No.: PCT/SE90/00326
§ 371 Date: Nov. 13, 1991
§ 102(e) Date: Nov. 13, 1991

[87] PCT Pub. No.: WO90/14610
PCT Pub. Date: Nov. 29, 1990

[30] Foreign Application Priority Data

May 19, 1989 [SE] Sweden .................. 8901797

[51] Int. Cl.⁵ .................. G02B 27/02; A47F 1/14
[52] U.S. Cl. .................. 359/804; 359/811; 359/815; 248/467
[58] Field of Search .................. 359/798-820, 359/860, 862, 871, 838, 871, 879-882; 248/690-692, 591-593, 466-474; 108/149, 151-159; 403/72-80

[56] References Cited

U.S. PATENT DOCUMENTS

| 404,021 | 5/1889 | Tice | 359/860 |
| 763,380 | 6/1904 | Eble et al. | 359/860 |
| 1,886,747 | 11/1932 | Schroder | 359/817 |
| 2,176,329 | 10/1939 | Chambers | 359/804 |
| 3,936,156 | 2/1976 | Shaw et al. | 359/802 |
| 3,970,369 | 7/1976 | Wachsman | 359/732 |
| 3,996,947 | 12/1976 | Szpur et al. | 359/726 |
| 4,051,535 | 9/1977 | Inglis | 359/809 |
| 4,071,174 | 1/1978 | Weiner | 359/801 |
| 4,826,307 | 5/1989 | Pandolfino, Jr. | 359/838 |
| 4,856,888 | 8/1989 | Wahl | 248/467 |
| 5,132,849 | 7/1992 | Cordes | 359/810 |

Primary Examiner—Bruce Y. Arnold
Assistant Examiner—Thong Nguyen
Attorney, Agent, or Firm—Anderson Kill Olick & Oshinsky

[57] ABSTRACT

The invention relates to a reflection aid (1) intended to increase the ability of users to see, without the inconvenience of spectacles, for example when applying a make-up, which comprises an optical lens (3) capable of attachment to a mirror (4) of the kind in question by means of a fastening device (5). Said lens (3) is attached to the mirror attachment device (5) in such a way that the lens (3), when in the position (A) ready for use, can be set to the desired distance (L) from the mirror (4).

10 Claims, 4 Drawing Sheets

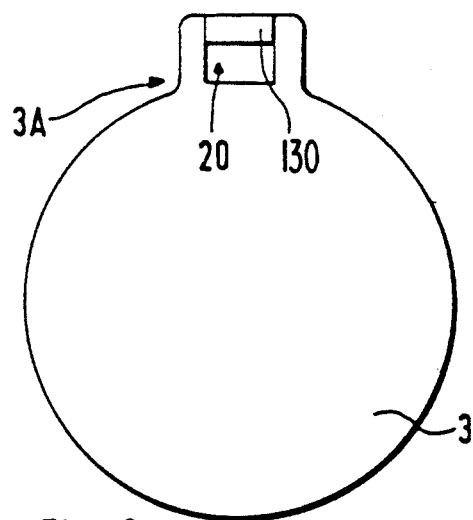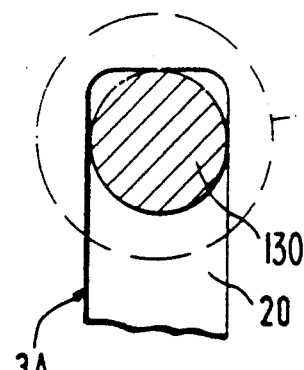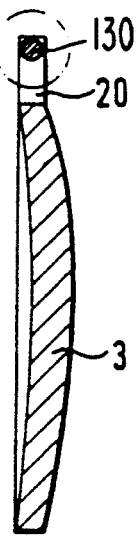
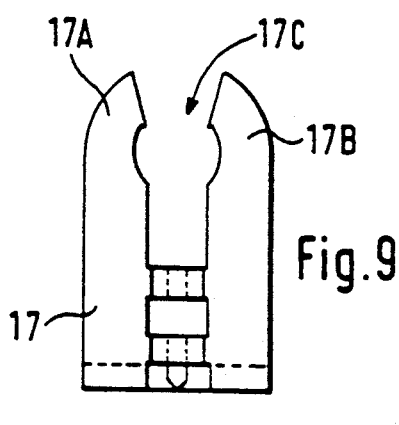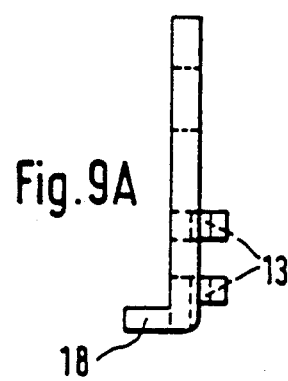
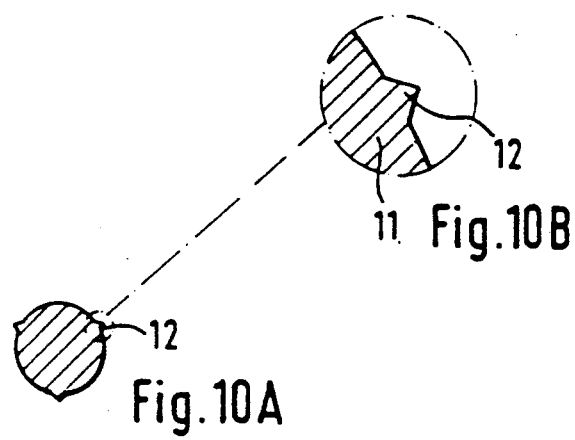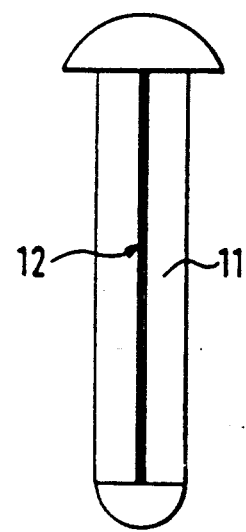

REFLECTION AID

The present invention relates to a reflection aid intended to increase the ability of users to see, without the inconvenience of spectacles, for example when applying make-up, which comprises an optical lens capable of attachment to a mirror of the kind in question by means of a fastening device.

Problems are faced by persons who are presbyopic (an age-related diminishing ability of the eye to focus), who for various reasons do not wear contact lenses, and who need an optical aid when looking at themselves in a mirror, for example women who wish to apply make-up. The construction disclosed in U.S. Pat. No. 3,996,947, for example, which is intended to be of help when painting, comprises auxiliary optical lenses supported by braces which permit the lenses to be swung up out of a storage box which is capable of attachment to a mirror by means of suction plugs. No possibility is offered, however, to vary the distance between the mirror of the kind in question and said lenses in the position ready for use, and the distance is decidedly fixed, which represents a considerable problem.

The construction disclosed in U.S. Pat. No. 3,970,369 comprises auxiliary optical lenses which are attached along the frame of a mirror, and which nevertheless offer the facility for adjustment to the desired distance from the reflection surface of the mirror of the kind in question. However, this previously disclosed construction is locked to a specific mirror, which exhibits special fastening devices for said auxiliary optical lens/lenses, which does not make the aid easily portable by the user, for example when travelling and when visiting the washroom, for example, and prevents the lens from being attached to the desired mirror on the desired occasions.

The principal object of the present invention is thus, in the first place, to solve said problem with a portable aid which exhibits a simple means of adjustment of the lens in relation to the mirror which is being used.

Said object is achieved by means of a reflection aid of the kind described above, which is characterized essentially in that the aid, which comprises a fastening device capable of easy attachment to and removal from a mirror, also includes a number of arms which are pivotally attached to one another via articulated links in such a way that the arms are capable of angular adjustment relative to one another laterally and can be moved between a retracted storage position and an extended position ready for reflection, so that the lens can be set to the desired distance from the mirror.

The invention is described below as a preferred illustrative embodiment, in conjunction with which reference is made to drawings, where FIG. 1 shows a view from the side of an aid in the extended position in which it is ready for reflection;

FIGS. 8–8B show an auxiliary optical lens from the front, in section and in detail;

FIGS. 9–9A show an attachment for a mirror attachment device from a front view and a side view, respectively;

FIGS. 10–10B show an articulation rivet viewed from the side, in section and in detail.

Figure 1:
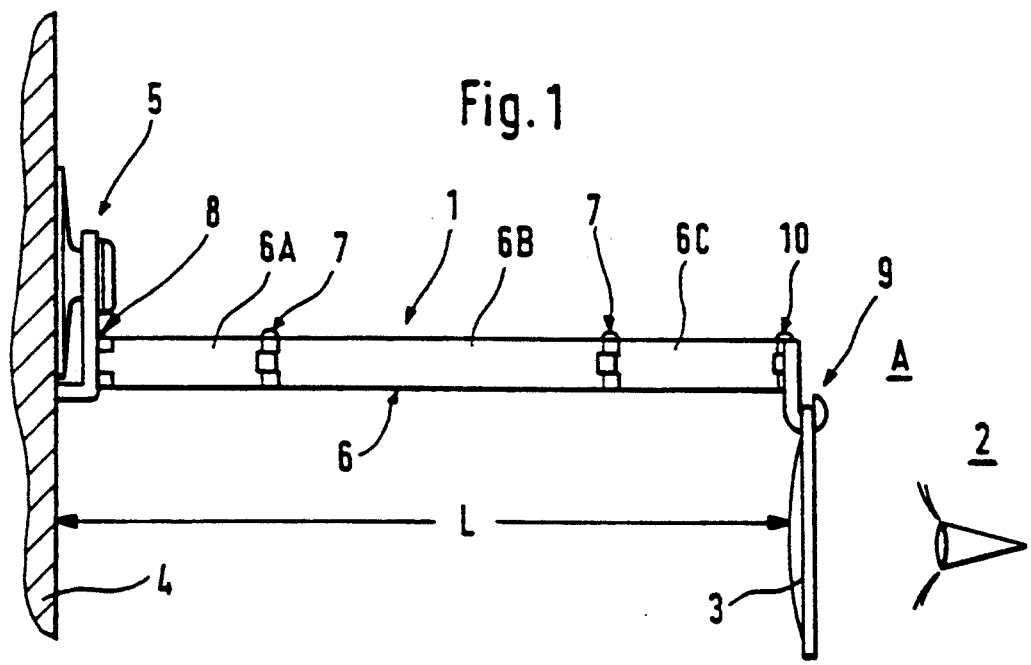
Figure 2:
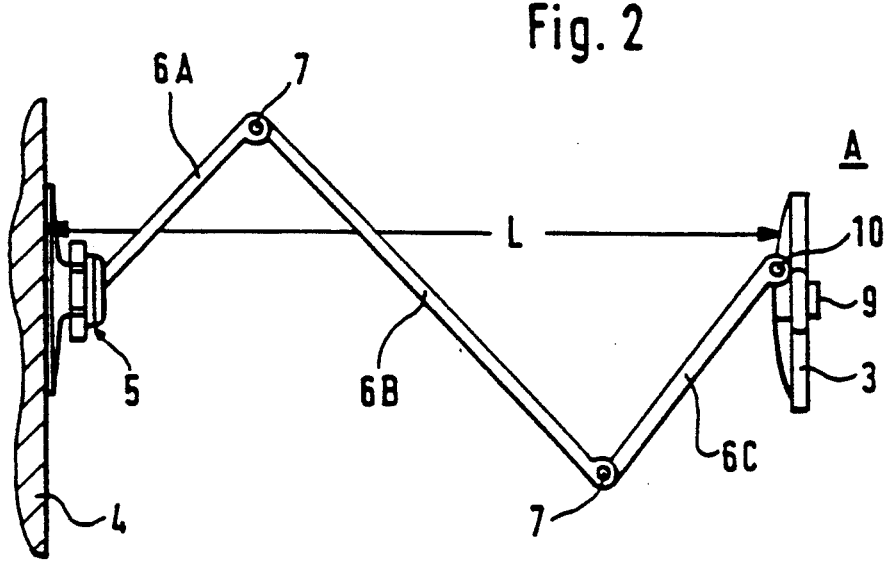
FIG. 2 shows a view from above of the aid in the corresponding position.
Figure 3:
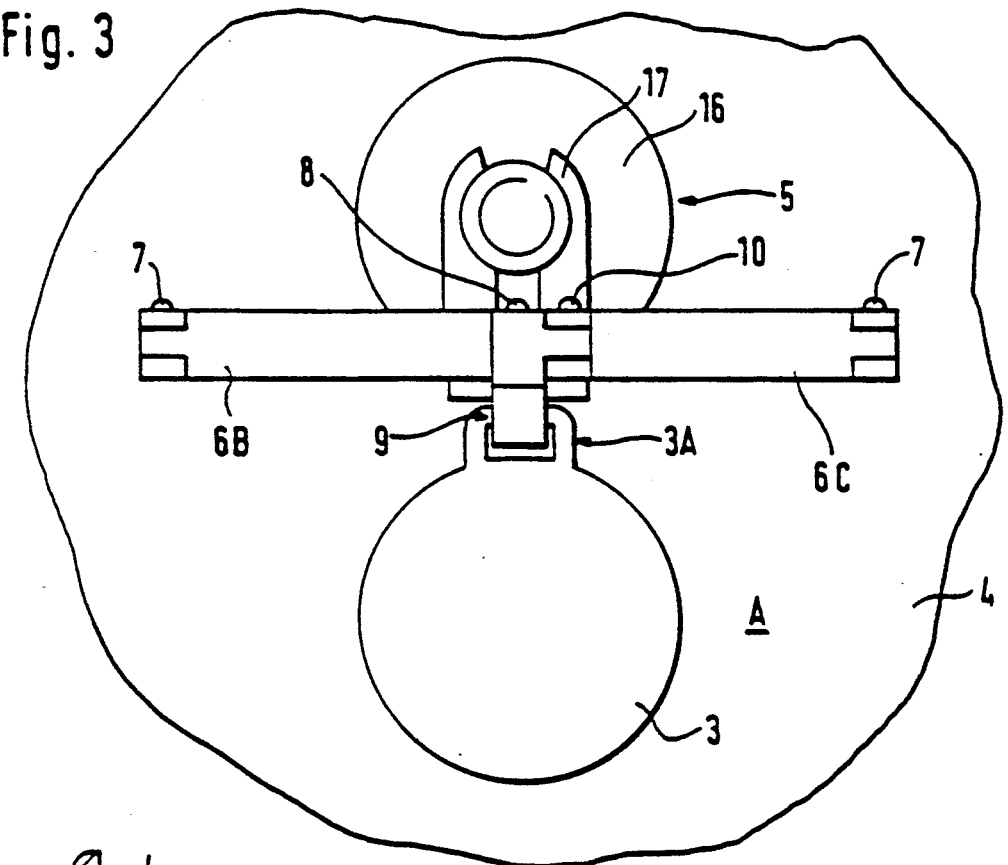
FIG. 3 shows a view from the front of the aid in the retracted position.
Figure 4:
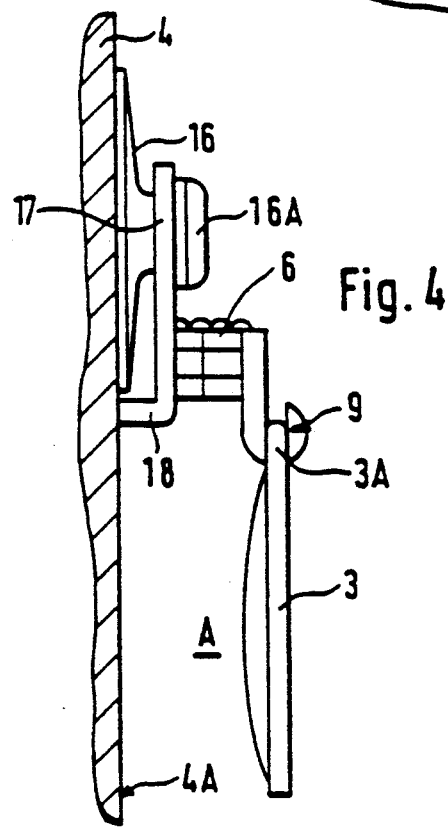
FIG. 4 shows a view from the side of the aid in the retracted position.
Figure 5:
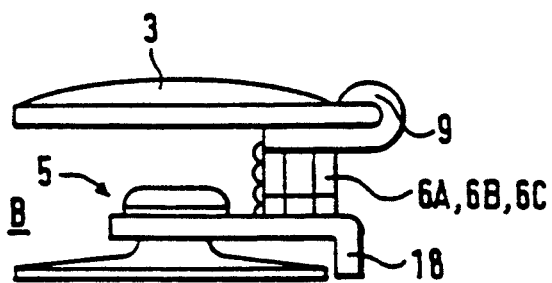
FIG. 5 shows a view from the side of the aid in the retracted and raised storage position.
Figure 6:
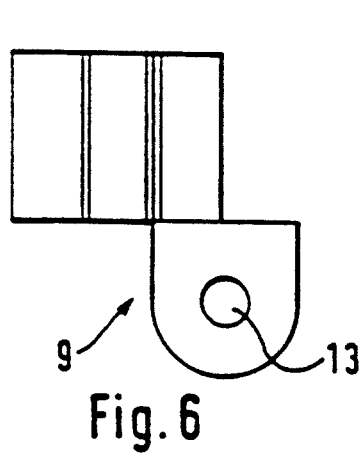
FIGS. 6–6B show a lens attachment from a side view, a front view and a top view, respectively.
Figure 6A:
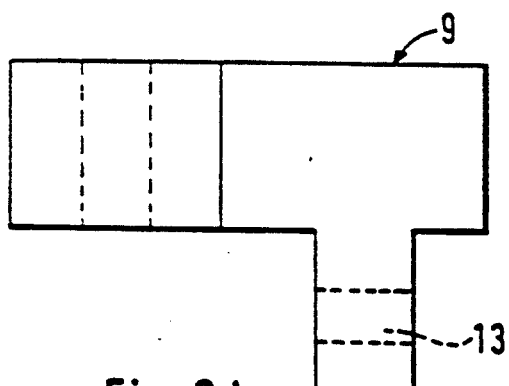
Figure 6B:
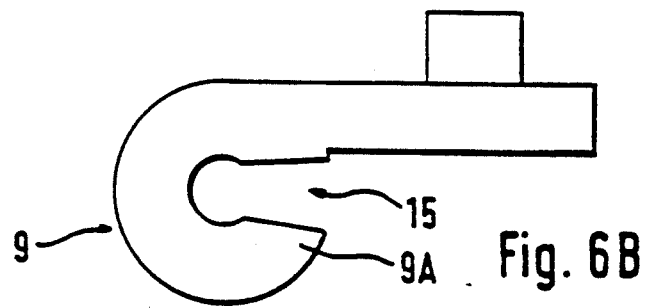
Figure 7:
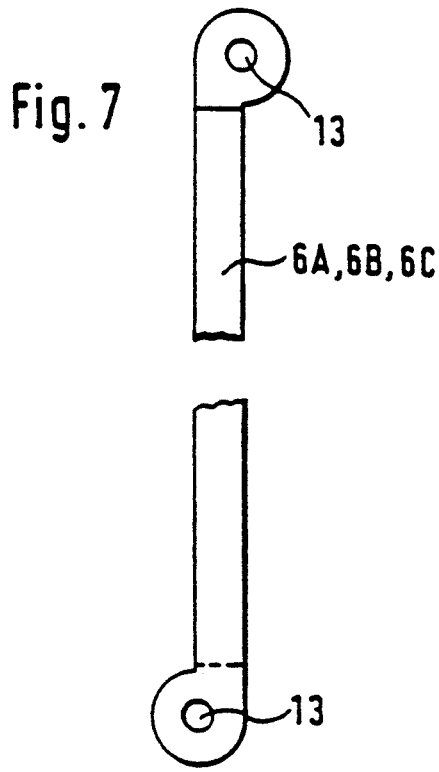
FIGS. 7–7A show an attachment arm from a side view and a front view, respectively.
Figure 7A:
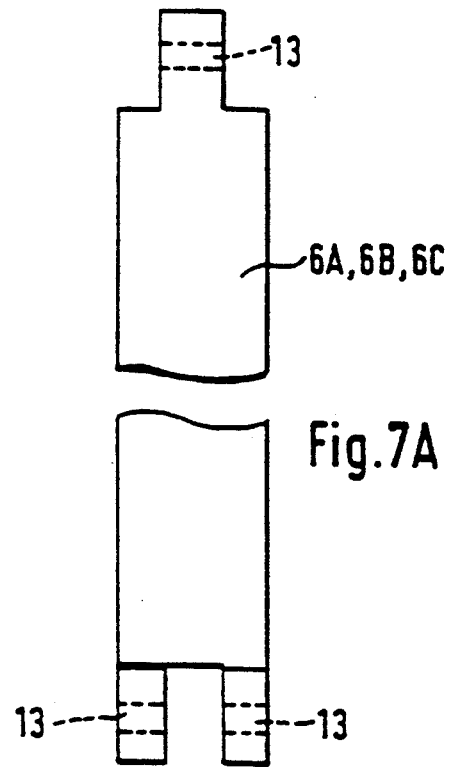

A reflection aid 1 in accordance with the present invention, which is intended to increase the ability of users 2 of the aid 1 to see, without having to suffer the inconvenience of wearing spectacles, for example when applying make-up, which comprises an optical lens 3 capable of attachment to a mirror 4 of the kind in question by means of a fastening device 5, includes means 6 which permit the lens 3, when it is attached to the mirror attachment device 5 in the reflection position A in which it is ready for use, to be set to the desired distance L from the mirror 4.

Said means 6 comprises a number of arms 6A, 6B, 6C, the positions of which are adjustable in relation to one another.

Said attachment arms 6A–6C are pivotally attached to one another via articulations 7, so that the arms are capable of angular adjustment relative to one another between the retracted storage position B and the extended reflection position A in which the aid is ready for use.

One arm 6A is preferably pivotally connected via an articulation 8 to a fastening device 5 of said kind capable of easy attachment to and removal from a mirror 4, and a second arm 6C is pivotally connected to an attachment 9 executed preferably in the form of a hook for the purpose of supporting at least one optical lens 3 on the arm 6C via an articulation 10.

The articulations 7, 8, 10 may suitably be executed in the form of rivets 11 which exhibit a number of ridges 12, which are distributed along the periphery of said rivets, for example at a a pitch of approximately 120°, and which extend in the longitudinal sense of the rivets, which rivets are accommodated by bearing holes 13 in the corresponding articulation.

An optical lens 3 of the kind in question is suitably so arranged as to be supported by means of an associated bearing shaft 130, which can be integrated as a part of one end 3A of the lens with a formed accommodating hole 20 for the part 9A of said bearing attachment hook 9, such that the shaft 130 shall be capable of being accommodated by said hook 9 in its inner accommodating space 15 with the lens capable of being pivoted between an extended reflection position A in which it is ready for use and a retracted storage position B.

The mirror attachment device 5 can suitably consist of a suction plug device, which comprises a suction plug 16 supported by a plug attachment 17, which attachment is in the form of, for example, two arms 17A, 17B, which, in the space 17C formed between them, are capable of accommodating and retaining the rear end 16A of a suction plug 16.

In the example illustrated here, the suction plug attachment 17 exhibits a support component 18 angled towards an intended mirror 4, which support component is capable of being placed against the reflective surface 4A of a mirror for the purpose of forming a support against the mirror 4.

A support arm 6A is connected for this purpose to said plug attachment 17 between the formed accommodating opening 17C for the plug 16, 16A and support component 18, so that the maximum carrying capacity for the attachment device 5 is achieved.

The function of the aid 1 described above and shown in the drawings should have been appreciated, although the invention is not restricted to this and can be varied within the scope of the Patent Claims without departing from the idea of invention.

We claim:

1. A reflection aid intended to improve the ability of users to see, without the inconvenience of spectacles, which comprises:
   an optical lens which is attachable to a mirror by means of a fastening device wherein said fastening device is capable of attachment to and removal from said mirror;
   a plurality of arms which are pivotally attached to one another via articulated links so that said arms are capable of angular adjustment relative to one another laterally and are moveable between a retracted storage position and an extended position so that said lens can be set to a desired distance from said mirror;
   at least one of said arms is pivotally connected via an articulation to said fastening device for attachment to and removal from said mirror;
   an attachment for supporting said optical lens is arranged on one of said pivotally mounted arms,
   said attachment is in the form of a hook which is pivotally attached to said arm.

2. A reflection aid intended to improve the ability of users to use, without the inconvenience of spectacles, which comprises:
   an optical lens which is attachable to a mirror by means of a fastening device wherein said fastening device is capable of attachment to and removal from said mirror;
   a plurality of arms which are pivotally attached to one another via articulated links so that said arms are capable of angular adjustment relative to one another laterally and are moveable between a retracted storage position and an extended position so that said lens can be set to a desired distance from said mirror;
   at least one of said arms is pivotally connected via an articulation to said fastening device for attachment to and removal from said mirror;
   an attachment for supporting said optical lens is arranged on one of said pivotally mounted arms,
   said attachment is in the form of a hook which is pivotally attached to said arm,
   and further wherein an optical lens is arranged to be accommodated by said attachment hook by means of an associated bearing shaft, said lens is pivotable between an extended position and a retracted storage position.

3. The reflection aid in any one of claims 1 or 2 wherein said mirror attachment device comprises:
   a suction plug arrangement.

4. The reflection aid of claim 3, wherein said suction plug arrangement is supported by a plug attachment, which exhibits a support component capable of being place against a mirror, and further wherein at least one of said arms is connected to said plug-attachment between an accommodating opening of said plug and said support component.

5. The reflection aid of claim 1, wherein said fastening device and said lens are situated on a top side of said arms, when said aid is held in a storage position and with said fastening device on said top side of said arms and with said lens on a bottom side of said arms when said aid is held in said extended position.

6. The reflection aid of claim 1, wherein said articulated links are in the form of rivets, which are accommodated by bearing holes in a corresponding articulation, in such a way that they extend along one another so that said arms can be set at an angle laterally relative to one another.

7. The reflection aid of claim 6, wherein said articulation for at least one of said arms and a plug attachment are situated between a component resting against a mirror and a plug attachment.

8. The reflection aid of claim 2, wherein said fastening device and said lens are situated on a top side of said arms, when said aid is held in a storage position and with said fastening device on said top side of said arms and with said lens on a bottom side of said arms when said aid is held in said extended position.

9. The reflection aid of claim 2, wherein said articulated links are in the form of rivets, which are accommodated by bearing holes in a corresponding articulation, in such a way that they extend along one another so that said arms can be set at an angle laterally relative to one another.

10. The reflection aid of claim 9, wherein said articulation for at least one of said arms and a plug attachment are situated between a component resting against a mirror and a plug attachment.

* * * * *